United States Patent

[11] 3,583,531

| [72] | Inventor | Kirk Besoyan |
| --- | --- | --- |
| | | Blythe, Calif. |
| [21] | Appl. No. | 859,000 |
| [22] | Filed | Sept. 18, 1969 |
| [45] | Patented | June 8, 1971 |
| [73] | Assignee | Safety "Vee" Brake, Inc. |
| | | Blythe, Calif. |
| | | Continuation-in-part of application Ser. No. 802,751, Feb. 19, 1969, now Patent No. 3,516,519, Continuation of application Ser. No. 591,513, Nov. 2, 1966, now abandoned. |

[54] AUXILIARY BRAKE AND BRAKING SYSTEM
7 Claims, 8 Drawing Figs.

[52] U.S. Cl. .................................................. 188/77,
188/162, 188/250, 188/259, 192/80
[51] Int. Cl. .................................................. F16d 63/00
[50] Field of Search .......................................... 188/70, 77,
250 B, 162, 259; 192/80

[56] References Cited
UNITED STATES PATENTS

| 966,312 | 8/1910 | Crenshaw | 188/77 |
| --- | --- | --- | --- |
| 1,060,511 | 4/1913 | Svenson | 188/77X |
| 1,426,543 | 8/1922 | Bonner | 188/77X |
| 1,465,832 | 8/1923 | Andel | 188/77 |
| 2,734,590 | 2/1956 | Hays, Jr. | 188/162X |
| 3,313,379 | 4/1967 | Dence | 188/250(B)X |

FOREIGN PATENTS

| 6,360 | 2/1892 | Great Britain | 188/259 |
| --- | --- | --- | --- |

Primary Examiner—George E. A. Halvosa
Attorney—Watson, Cole, Grindle & Watson

ABSTRACT: An independently controlled auxiliary brake mounted on a vehicle axle comprises a resilient rod member having a plurality of friction elements thereon cooperating with a grooved sheave mounted on the wheel or brake drum of the vehicle. The rod member extends about the sheave so that axial movement of one end of the rod member moves each friction element into frictional engagement with the sidewalls of the sheave groove so thereby brake the vehicle.

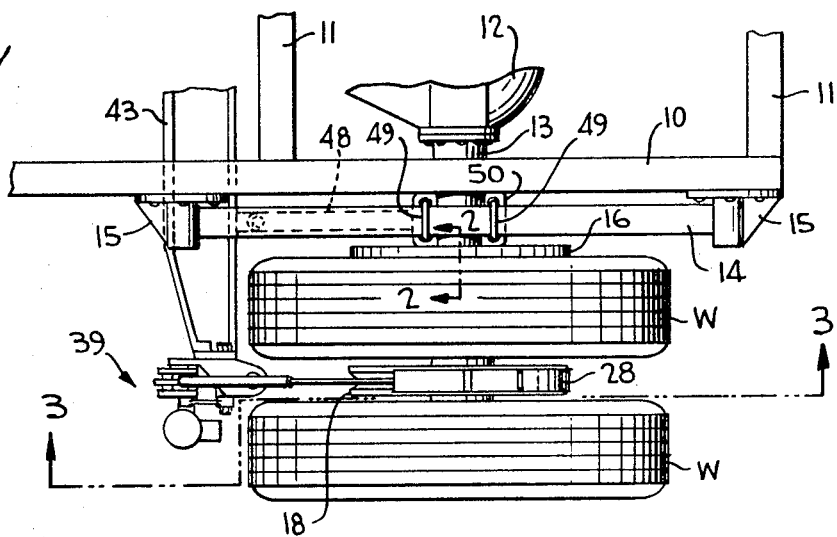
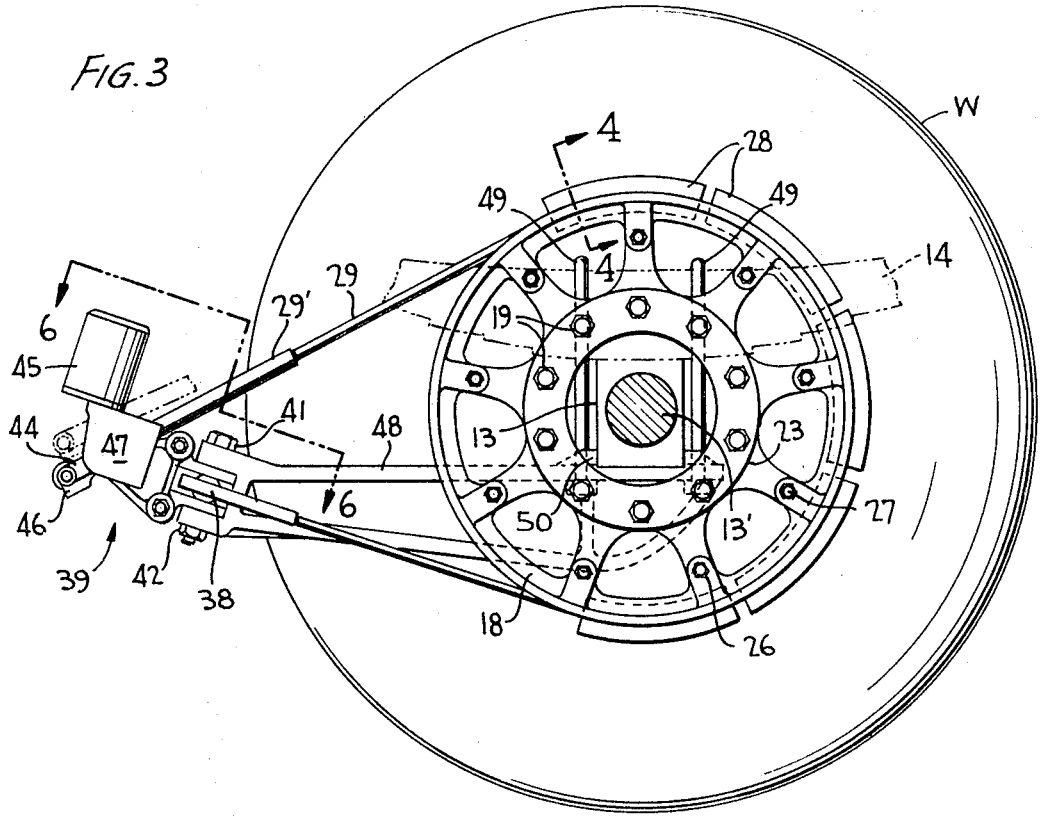

PATENTED JUN 8 1971
3,583,531
SHEET 2 OF 2
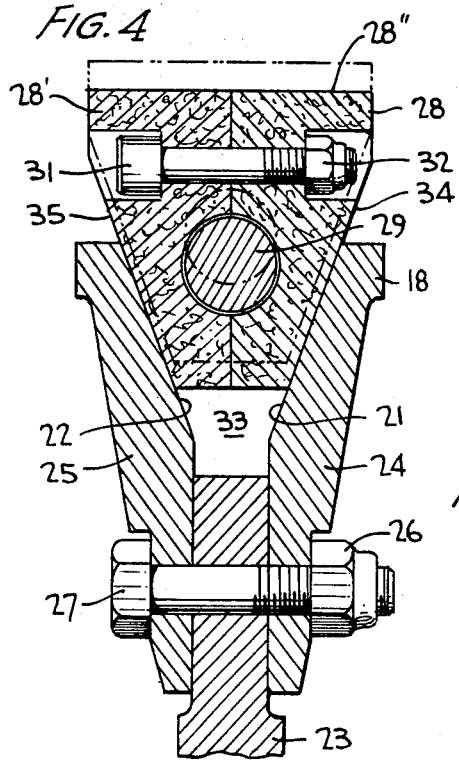
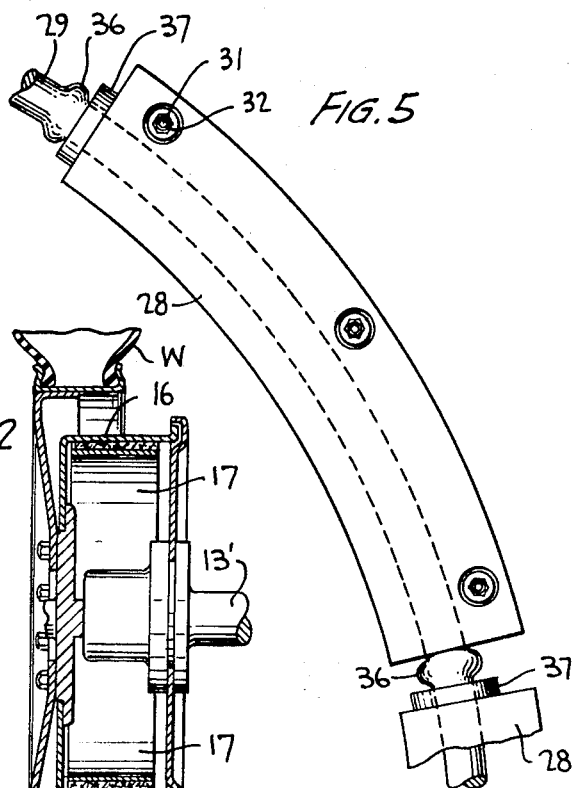
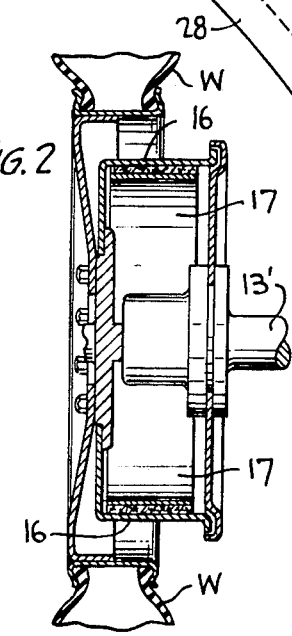
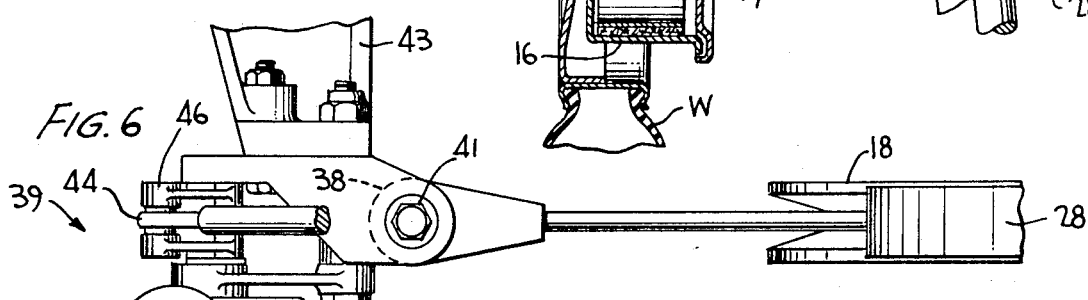
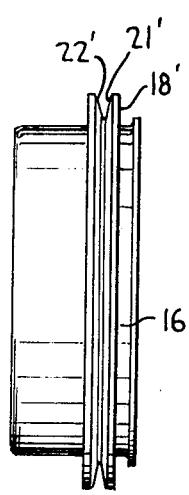
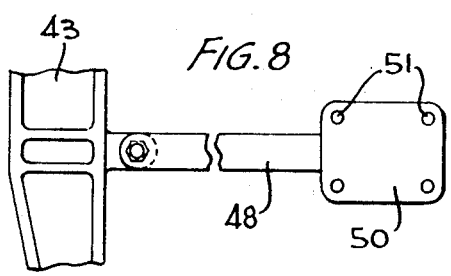
INVENTOR,
KIRK BESOYAN
BY
Watson, Cole, Grindle & Watson
ATTORNEYS

AUXILIARY BRAKE AND BRAKING SYSTEM

This is a continuation-in-part application of pending application Ser. No. 802,751, filed Feb. 19, 1969, now U.S. Pat. No. 3,516,519, which is a continuation application of application Ser. No. 591,513, filed Nov. 2, 1966, now abandoned.

This invention relates generally to a vehicle braking system and more particularly to a brake utilizing friction elements in combination with a sheave for applying the necessary braking force to a vehicle.

In the referred-to applications, an auxiliary braking means is disclosed for use in the event of failure of the standard brakes provided on motor vehicles such as trucks and truck tractors. The braking system may also be used as a parking brake or as a substitute for the conventional braking system now used on motor vehicles. The braking system of this continuation-in-part application is similar in its primary objective to that of the referred-to applications but improves upon the operation and technique for braking a motor vehicle as heretofore devised. Instead of using a flexible cable for supporting a plurality of friction elements about a sheave having a V-shaped groove which in effect, forms the brake drum as friction elements are drawn into the groove for frictional engagement therewith, it has been found that a resilient rod member carrying a plurality of friction elements and movable toward and away from the bottom of the sheave groove offers considerable advantages not found in the prior art. For example, the rod member greatly simplifies attachment of the friction elements thereto. The resilient rod member becomes a self-releasing spring when allowed to expand and therefore eliminates the necessity for auxiliary retractive springs as in the earlier cable system. Also, the rod permits the use of inexpensive and homogeneous flaired bead means between friction elements for proportionately distributing friction element loadings that would otherwise require expensive swaging means on a resilient cable. Furthermore, the rod member may be heat treated to a higher degree as compared to that of the cable thereby resulting in a saving in both space and weight of the braking system.

The device described in the above referred-to applications is disclosed as being mounted on the vehicle frame whereas the instant braking system contemplates mounting the device on the vehicle axle. It was found that under various conditions of travel, a single axle may move several inches up and down relative to the vehicle frame. Accordingly, such movement could easily cause the brakes to inadvertently release after being applied or, cause the brakes to be applied when they are intended to be released. By mounting the instant device directly to the axle, the system remains in constant relationship with the braking elements so that a braking force is applied only during intended brake applications and not during conditions of travel. Another object of the invention is to provide an auxiliary brake and braking system which is lighter in total deadweight as compared to similar systems, and is easier to maintain as when it becomes necessary to service or replace the friction elements or other components of the system thereby reducing the down time of the equipment.

A further object of the present invention is to provide an auxiliary braking system which is axle mounted from a transversely extending beam member which supports the resilient rod member and its actuating means at either end thereof.

A still further object of this invention is to provide an auxiliary brake usable with a dual wheel construction wherein the sheave is mounted between the wheels or on the outer periphery of the existing brake drum.

Other objects, advantages, and novel features of the invention will become apparent from the following detailed description of the invention when considered in conjunction with the accompanying drawings wherein:

FIG. 1 is a top plan view of a portion of the rear part of the vehicle chassis shown with the braking system according to the invention;

FIG. 2 is a sectional view taken substantially along the line 2–2 of FIG. 1 showing the conventional brake drum;

FIG. 3 is a side elevational view of the braking system taken along the line 3–3 of FIG. 1;

FIG. 4 is an enlarged sectional view of a friction element in combination with the sheave walls taken substantially along the line 4–4 of FIG. 3;

FIG. 5 is an enlarged fragmentary view in side elevation of one of the friction elements and the means for mounting it to the resilient rod member;

FIG. 6 is a top view showing the actuating mechanism taken along the line 6–6 of FIG. 3;

FIG. 7 is a modified form of the invention wherein the sheave is mounted on the periphery of the conventional brake drum; and FIG. 8 is a fragmentary view in plan showing the means for mounting the brake system to the vehicle axle.

Referring now to the drawings wherein like reference characters refer to like and corresponding parts throughout the several views, FIG. 1 is a top or plan view of left side of a dual wheel vehicle chassis rear portion showing the braking system according to the instant invention applied thereto. It should be understood that the right side of the dual wheel vehicle chassis and braking system is identical to that shown in FIG. 1, and merely oppositely related. Side frame member 10, cross frame members 11 and the differential casing 12 all form a part of the conventional chassis. Axle housing 13 is supported on leaf springs 14 mounted at opposite ends by means of conventional spring mounting plates 15 from side frame member 10. A pair of dual wheels W is mounted at one end of the enclosed axle 13' in any ordinary manner and a brake drum 16 of conventional design is provided within the inner wheel W as part of the standard braking system utilizing standard brake shoes 17 (see FIG. 2).

Between each of the dual wheels W a sheave member 18 is mounted onto the axle as by suitable wheel stud bolts and nuts generally designated 19, as in FIG. 3. The sheave 18 comprises a central hub 23 to which a pair of outer rings 24, 25 are secured as by means of nuts 26 and bolts 27. The inner walls 21, 22 of each pair of sheave rings 24, 25 converge inwardly, as seen most clearly in FIG. 4. By reason of the members 23, 24, 25 being bolted together as shown, sheave 18 may be easily assembled and disassembled when replacement becomes necessary or when access to any one of the friction elements 26 is required. As shown, a plurality friction elements 28 are independently carried by a resilient rod member 29, each friction element comprising half sections 28', 28' secured to rod member 29 as by means of bolts 31 and nuts 32. The inwardly converging walls 21, 22 of the sheave present a peripheral groove 33 which is of truncated V-form. The outer walls of each half-section pair 28', 2" of each friction element 28 also converge inwardly along a slope equal to that of walls 21, 22. Accordingly, each friction element is of truncated V-shape in cross section similar to that of peripheral groove 33 so as to frictionally cooperate with walls 21, 22 of the sheave. The rod member 29, in the embodiment shown, carries five friction elements 28 and extends about the sheave 18 in a common plane over at least 180° of the sheave circumference. Axial displacement of each friction element on the rod member 29 is prevented by means of homogeneous flaired beads 36 provided along the length of the rod member in any conventional manner a distance equal to the arc length of each friction element plus the thickness of a space member 37.

One end of rod member 29 is affixed as by an eyebolt 38 to an actuator means assembly 39 as by a bolt 41 and nut 42. A beam member 43 is provided extending across the width of the vehicle chassis and provides a mount for the actuator means assembly 39 at both ends thereof. The other end of rod member 29 is secured to the actuator means as at 44 shown in FIG. 6. The actuator means assembly comprises a reversible electric motor 45 having a rotary arm 46 thereon by which the rod is secured thereto as at 44. The rotary arm 46 may be rotated in a direction to either move the free end 44 of the rod either toward or away from the vehicle axle by means of a gear unit 47. FIG. 3 shows in solid lines the free end 44 in its braking position as being farthest from the vehicle axle. Also, the end of rod 29 is shown in phantom in a brake release position after the rotary arm 46 has been rotated slightly clockwise so as to permit the free end 44 to move slightly toward the vehicle axle. Should any adjustment of the length of rod 29 become necessary, an internally threaded sleeve member 29' is provided for adjustment on an externally threaded portion of the rod 29 end portion.

The braking system of the present invention is axle mounted so that it will follow movement of the axle during vehicle operation and not be affected by any disparity of movement between the vehicle frame and the vehicle axle. The beam 43, to which the actuator means assembly is mounted at either end, is secured to the axle housing 13 by means of a pair (only one shown) of rearwardly extending arms 48 each having a mounting plate 50 at the free end thereof. A pair of U-bolts 49, 49, usable in the conventional truck chassis for securing the springs to the axle, are used for mounting the arms 48 to the underside of the axle housing through apertures 51 provided in each plate 50. In this way, each of the plates 50 actually replaces the conventional mounting plate otherwise used with U-bolts of this type.

In operation, rotation of rotary arm 46 in a counterclockwise direction (when viewing FIG. 3) will serve to tighten the rod member 29 about the sheave 18 thereby bringing the walls 34, 35 of the friction element sections 28', 28'' into frictional contact with the walls 21, 22, respectively, of the sheave so as to apply a braking force to the vehicle. Likewise, rotation of the rotary arm 46 in a clockwise direction will serve to slightly loosen the rod 29 about the sheave and cause the friction elements 28 to disengage themselves from the walls 21, 22 of the sheave so that a position of the friction elements as shown in phantom in FIG. 4 will result.

In FIG. 7, another embodiment of the invention is shown whereby a sheave 18' is secured to the outer periphery of the brake drum 16 instead of being mounted between the dual wheels as shown in FIG. 1 of the drawings. Here, the sheave 18' is a ring member having an inner diameter equal to the outer diameter of the brake drum 16 and secured thereto as by welding or some other suitable means. Also, walls 21', 22' are similar to walls 21, 22 of sheave member 18 so that the operation of the instant braking system is identical for both embodiments except that the beam 43 is designed shorter in length.

From the foregoing, it can be seen that the braking system according to the present invention provides a number of distinct improvements over existing systems including the above referred-to continuation application of which this forms a part. For example, the present system is of a lighter weight construction because substantially all the components are of aluminum except for the sheave ring members 24, 25 which may be of steel and the friction elements 28 which are or may be of a conventional brakeshoe composition. Also, it can be seen that the beam 43 and arms 48 are separable from each other and from the actuating means 39 thereby facilitating a wide variety of attachment conditions found in various equipment. This permits the system to be tailored to each type of vehicle without additional weight or increase in machining cost.

Because the present system is axle mounted instead of frame mounted the system remains in constant relationship with the braking elements under various conditions of travel. Also, the resilient rod means used in this invention provides a simple and efficient manner of mounting the friction elements thereto as by means of the homogeneous flaired beads 36. Since each of the friction elements is independently mounted to the rod member, each friction element bears a proportionate amount of braking force in relation to the bottommost element since the direction of travel of the vehicle is leftward as shown in FIGS. 1 and 3. Therefore, the bottommost element 28 bears approximately 80 percent of the braking force required to stop the vehicle while the remaining elements bear 60 percent, 40 percent, 20 percent, and 0 percent, respectively, of the force required to brake the vehicle. The use of a resilient rod member also eliminates the need for a backup spring plate or coil springs heretofore required because the resilient rod acts as a self-releasing spring upon actuation of the rotary arm in a direction toward the vehicle axle. Furthermore, since the rod means can be heat treated to most any desirable degree, it gives rise to a weight and space saving in the system. Because significantly fewer friction elements are used in the system as compared to prior systems, and because each is independently mounted to the rod member, the "chatter" inherent in the older system is eliminated.

The entire braking system structurally mounts in place of the existing lower axle pad of the vehicle and with the existing U-bolts of the vehicle. Since this system replaces the axle pads another slight saving in weight and space is achieved. Also, since the rim of the sheave is constructed of halves and since each friction element is molded in reversible halves along their longitudinal axis then bolted together on the resilient rod in proper location between the beads 36, the sheave and friction elements may be easily dismantled and reassembled when their replacement or maintenance becomes necessary.

I claim:

1. An auxiliary braking device for a vehicle having a frame, an axle carried by said frame, a wheel at opposite ends of said axle, comprising, in combination:
    a sheave secured relative to and concentric with at least one of said wheels for rotation therewith;
    a resilient rod member extending about said sheave in a common plane therewith over at least 180° of the sheave circumference, said rod member being movable toward and away from the bottom of the sheave groove;
    friction elements independently mounted on said rod member within the limits of the rod member extension, each of said friction elements comprising a pair of longitudinal half sections each longitudinally grooved so as to facilitate mounting of said half sections, and fastening means for securing said half sections together, said rod member having retaining beads thereon formed at opposite ends of each said friction elements for independently mounting said elements thereon, said friction elements being movable by said rod member into and out of frictional engagement with the sidewalls defining the groove of said sheave;
    and means mounted on said vehicle for moving one end of said rod member toward and away from said axle, thereby effecting movement of said rod member extension toward and away from said groove bottom and movement of said friction elements into and out of frictional engagement with said sheave groove sidewalls, said means mounted on said vehicle axle comprising a reversible electric motor, a beam arranged parallel to said axle and having mounting arms extending toward said axle and secured thereto, said motor being operatively connected to said rod member one end for effecting the movement thereof toward and away from said vehicle axle.

2. The braking device according to claim 1, wherein said vehicle comprises a pair of dual wheels at each end of said axle, said sheave being secured to said axle between one of said pair of dual wheels.

3. The braking device according to claim 1, wherein said vehicle has a conventional brake drum and conventional brake shoes associated with each of said wheels for braking said vehicle independently of said auxiliary braking device, said sheave being secured to the outer periphery of at least one of said drums.

4. The braking device according to claim 1, wherein the outer walls of said friction elements are respectively parallel to said sheave groove sidewalls and wherein each of said friction elements is formed substantially in the shape of a truncated pyramid in cross section.

5. The braking device according to claim 4, wherein a sheave is secured relative to and concentric with each of said wheels for rotation therewith, a resilient rod member extending about each said sheave in a common plane therewith over at least 180° of each sheave circumference, each said rod member being movable toward and away from the bottom of the groove of each said sheave; friction elements secured to each said rod member within the limits of each rod member extension, said friction elements being movable by each said rod member into and out of frictional engagement with the sidewalls defining the groove of such sheave and means mounted on said vehicle axle for moving one end of each said rod member toward and away from said axle, thereby effecting movement of each said rod member toward and away from each said sheave groove bottom, and the movement of said friction elements, into and out of frictional engagement with each said sheave groove sidewalls.

6. The braking device according to claim 5, wherein said vehicle comprises a pair of dual wheels at each end of said axle, each said sheave being secured to said axle between each of said pair of wheels.

7. The braking device according to claim 5, wherein said vehicle has a conventional brake drum associated with each of said wheels, each said sheave being secured to the outer periphery of each said drum.